United States Patent
Xu et al.

(10) Patent No.: US 11,443,197 B2
(45) Date of Patent: Sep. 13, 2022

(54) AUTO-SOLUTION HELP DESK ADVISOR

(71) Applicant: SAP SE, Walldorf (DE)

(72) Inventors: Qi Xu, Hangzhou (CN); Jian Sun, Shanghai (CN); Ting Wang, Shanghai (CN); Yubo Mao, Shanghai (CN); Changcheng Li, Shanghai (CN); Yilan Hu, Shanghai (CN); Yanlin Liu, Shanghai (CN)

(73) Assignee: SAP SE, Walldorf (DE)

( * ) Notice: Subject to any disclaimer, the term of this patent is extended or adjusted under 35 U.S.C. 154(b) by 1011 days.

(21) Appl. No.: 15/878,896

(22) Filed: Jan. 24, 2018

(65) Prior Publication Data
US 2019/0228315 A1     Jul. 25, 2019

(51) Int. Cl.
*G06N 5/02* (2006.01)
*G06N 20/00* (2019.01)
*G06F 9/451* (2018.01)
*G06F 16/951* (2019.01)

(52) U.S. Cl.
CPC ............. *G06N 5/02* (2013.01); *G06F 9/453* (2018.02); *G06N 20/00* (2019.01); *G06F 16/951* (2019.01)

(58) Field of Classification Search
CPC .......... G06N 5/02; G06N 20/00; G06N 20/10; G06N 20/20; G06N 5/04; G06N 5/00; G06F 9/453; G06F 16/951
See application file for complete search history.

(56) References Cited

U.S. PATENT DOCUMENTS

| | | | |
|---|---|---|---|
| 8,825,648 B2 * | 9/2014 | Ni | G06F 40/284 707/737 |
| 9,582,757 B1 * | 2/2017 | Holmes | G06N 3/006 |
| 9,672,497 B1 * | 6/2017 | Lewis | G06F 40/40 |
| 10,755,177 B1 * | 8/2020 | Dabney | G06F 40/30 |
| 2015/0356142 A1 * | 12/2015 | Proux | G06F 16/334 706/11 |
| 2017/0075988 A1 * | 3/2017 | Kadiri | G06N 5/02 |
| 2019/0141125 A1 * | 5/2019 | Ogrinz | H04L 67/306 |

OTHER PUBLICATIONS

Miller et al., "Topic Model Stability for Hierarchical Summarization", Sep. 7, 2017 https://www.aclweb.org/anthology/W17-4509.pdf (Year: 2017).*

(Continued)

*Primary Examiner* — Kamran Afshar
*Assistant Examiner* — Shoun J Abraham
(74) *Attorney, Agent, or Firm* — Mintz Levin Cohn Ferris Glovsky and Popeo, P.C.

(57) ABSTRACT

A system includes a processor that executes instructions stored in a memory to implement an auto-solution advisor on a server. The auto-solution advisor receives a current help request describing in lay language text a problem with a computer application or computing device, and determines whether the current help request is textually similar to a previous help request for a previous problem. Based on the similarity of the current help request to the previous help request, the auto-solution advisor assigns a known solution for the previous problem as the suggested solution for the current help request.

9 Claims, 4 Drawing Sheets

(56) References Cited

OTHER PUBLICATIONS

Somasundaram et al. "Automatic Categorization of Bug Reports Using Latent Dirichlet Allocation", Feb. 22, 2012 https://dl.acm.org/doi/abs/10.1145/2134254.2134276 (Year: 2012).*
Roy et al. "Clustering and Labeling IT Maintenance Tickets", Sep. 20, 2016 https://link.springer.com/chapter/10.1007/978-3-319-46295-0_58 (Year: 2016).*
Pingclasai et al. "Classifying Bug Reports to Bugs and Other Requests Using Topic Modeling", Mar. 6, 2014 https://ieeexplore.ieee.org/abstract/document/6754344 (Year: 2014).*
Xia et al. "Improving Automated Bug Triaging with Specialized Topic Model", Jun. 7, 2016 https://ieeexplore.ieee.org/abstract/document/7484672 (Year: 2016).*
Datta et al. "Will this be Quick?: A Case Study of Bug Resolution Times across Industrial Projects", 2015 https://dl.acm.org/doi/abs/10.1145/2723742.2723744 (Year: 2015).*

\* cited by examiner

Receiving, at a server, a help request describing a problem (e.g., with a computer application or computing device) 410

Filtering stop words, and stemming words in the text string of the help request 420

Determining a frequency distribution of words corresponding to pre-defined topics in the filtered and stemmed help request to determine a category of the help request 430

Comparing the category of the help request with categories of previous help requests 440

Determining that the category of the help request is similar to a specific previous help request 450

Automatically assigning the set of one or more known solutions associated with the specific previous help request as the suggested solutions for the present help request 460

AUTO-SOLUTION HELP DESK ADVISOR

TECHNICAL FIELD

This description generally relates to computer usage and user experiences. The description, in particular, relates to systems and techniques for providing help in resolving problems encountered by customers in computer usage.

BACKGROUND

With the increased complexity of computer and information technology systems, customers often need help in using the computer or information technology systems, and in resolving any problems they may encounter in using the computer or information technology systems. A help desk can help troubleshoot a customer's problems or provide guidance about products such as computers, electronic equipment, or software.

Organizations usually provide an "IT" help desk support to their information technology customers through various channels such as toll-free numbers, websites, instant messaging, or e-mail. IT help desk technicians provide technical support and troubleshooting services to end-users who need assistance with their computer hardware or software. Large help desks often have different levels to handle different types of questions. A first-level help desk may be prepared to answer the questions or provide the information commonly found among the FAQ or in a knowledge base. If the issue is not resolved at the first level, it can be forwarded to a second level with resources to handle more complex issues. Organizations may also have a third line of support to deal with software-specific needs, such as updates and bug fixes that directly affect a specific customer.

While a customer who needs help with a problem may communicate with the help desk any means (e.g., e-mail, on-line, web site, phone call), the help desk personnel have to manually diagnose and identify the specific problem based on the customer's description of the problem (which may be in lay or plain language) and manually identify a proper solution (e.g., a technical solution) to the customer's problem. However, this manual diagnosing and identification of problems can be a slow process, which does not always provide a quick or effective solution to the customer's problem.

Consideration is now given to help desk operations for providing quick and effective solutions to the customer's problem in computer and information technology system usage.

SUMMARY

A system includes a processor and a memory. The processor executes instructions stored in the memory to implement an auto-solution advisor on a server.

In a general aspect, the auto-solution advisor receives a current help request describing in text a problem with a computer application or computing device, and determines whether the current help request is textually similar to a previous help request for a previous problem. The previous help request may be associated with a known solution for the previous problem.

In a further aspect, the auto-solution advisor, based on the similarity of the current help request to the previous help request, assigns the known solution for the previous problem as the solution for the current help request.

In an aspect, determining whether the current help request is textually similar to a previous help request for a previous problem includes filtering stop words from, and stemming words in, the text of the current help request.

In an aspect, determining whether the help request is textually similar to a previous help request for a previous problem includes determining a frequency distribution of words corresponding to pre-defined topics in the filtered and stemmed help request to determine a category of the help request.

In an aspect, determining a frequency distribution of words corresponding to pre-defined topics in the filtered and stemmed help request includes using a Latent Dirichlet allocation (LDA) technique to automatically discover topics in the current help request.

In an aspect, determining a frequency distribution of words corresponding to pre-defined topics in the filtered and stemmed help request further includes categorizing the current help request based on the determined frequency distribution of words corresponding to pre-defined topics.

In an aspect, determining whether the current help request is textually similar to a previous help request for a previous problem includes determining whether the category of the current help request is similar to the category of the previous help request using a Kullback-Leibler distance (KLD) measure to determine a similarity of help request texts using a term-scoring function that is based on differences between the frequency distribution of topics in the current help request and the previous help request.

The details of one or more implementations are set forth in the accompanying drawings and the description below. Further features of the disclosed subject matter, its nature and various advantages will be more apparent from the accompanying drawings, the following detailed description, and the appended claims.

BRIEF DESCRIPTION OF THE DRAWINGS

The accompanying drawings, in which like numerals may indicate like components, illustrate embodiments of the disclosed subject matter.

FIG. 4 shows an example method for suggesting technical solutions in response to a help request with a problem (e.g., with a computer application or computing device) in an information technology environment, in accordance with the principles of the present disclosure.

DETAILED DESCRIPTION

Help desk or service desk software works to automate the service management and support functions in an information technology environment. Typical support functions may, for example, include helping users retrieve lost passwords, helping customers troubleshoot product issues, assisting employees with hardware and software technical problems, etc. Common service desk application features may include incident, problem and request management, which may involve assisting end users and customers in troubleshooting hardware, software, product, and other technical or operational/process related issues.

In accordance with the principles of the present disclosure, an automated solution advisor (ASA) may replace the manual diagnosis and identification by service desk staff of a problem described in a customer's help request with algorithm-based text analysis (e.g., using a Latent Dirichlet Allocation (LDA)) of the customer's plain language description of the problem. Latent Dirichlet allocation (LDA) is a technique that automatically discovers topics contained in a document (i.e., the customer's plain language description of the problem). Further, the ASA may involve machine learning to map the customer's plain language description of the problem to technical solutions of the problem. Self learning (i.e., machine learning) enables the ASA software to more effectively help automate end user and customer problem resolution without the need for service desk staff to intervene manually.

In accordance with the principles of the present disclosure, the ASA may compare a customer description of a new problem with reports of past problems. Millions of existing reports of past problems can provide words, sentences, digits, etc. as training data for machine learning to attach or match technical solutions to the customer description of the new problem.

In accordance with the principles of the present disclosure, even as a customer is typing a problem description (e.g., in a text input field on a user interface), the ASA may be triggered automatically to smartly analyze the customer's description as it is being typed in, identify the problem, and automatically suggest a technical solution to the customer.

Figure 1:
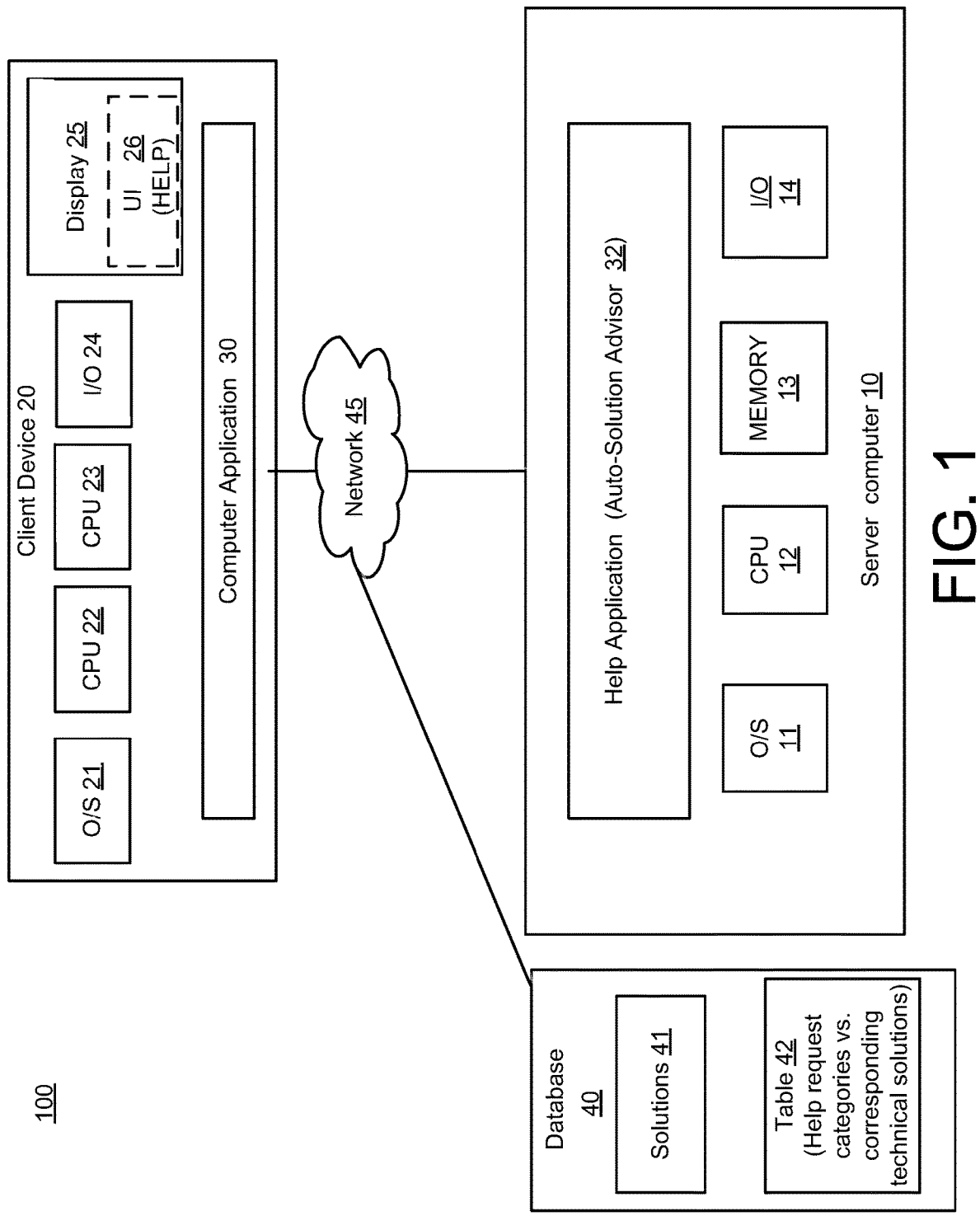
FIG. 1 is a schematic illustration of a system for implementing an automated solution advisor with help features for a client device, in accordance with the principles of the present disclosure.

FIG. 1 is a schematic illustration of a system 100 for implementing a help application (e.g., auto-solution advisor 32) with help features for a client device 20, in accordance with the principles of the present disclosure.

System 100 may include one or more server-side computing devices (e.g., computer 10), one or more databases (e.g., database 40) and one or more client devices (e.g., client device 20), which are interconnected, for example, by a network 45. For convenience in description herein, system 100 may be interchangeably referred to as "auto-solution advisor system 100."

System 100 may be configured to provide help solutions to a user of client device 20. Computer 10, which includes an O/S 11, a CPU 12, a memory 13, and I/O 14 may further include or be coupled to a database 40. Computer 10 may host, for example, an auto-solution advisor application 32, which can provide help solutions to the user of client device 20. Database 40 may, for example, include a dictionary of solutions for different possible problems that the user of client device 20 may have.

Client device 20, like computer 10, may include components such an O/S 21, a CPU 22, a memory 23, an I/O 24, a display 25 including a user interface (e.g., Help UI 26), etc. A user may, for example, install or run a computer application 30 on client device 20.

Client device 20 may be any computing device (e.g., a desktop computer, a mainframe computer, a server, a personal computer, a mobile computing device, a laptop, a tablet, or a smart phone), which may be available to a user to connect to computer 10 over network 45. Moreover, although computer 10 is shown in the example of FIG. 1 as a single computer, it may be understood that computer 10 may represent two or more physical machines (and/or a virtual machines) in communication with one another via network 45. Therefore, it will also be appreciated that any two or more components of system 100 may similarly be executed using some or all of the two or more computing devices in communication with one another. Conversely, it will also be appreciated that various components illustrated as being external to computer 10 may actually be implemented therewith.

System 100 may host auto-solution advisor application 32, for example, in a client-server configuration. FIG. 1 shows, for example, a user interface (e.g., Help UI 26) of auto-solution advisor application 32 presented as a front end element in display 25 of client device 20, and an application back end of auto-solution advisor application 32 hosted on computer 10. Help UI 26 may be user-activable, for example, to submit a request for help with a problem that the user may encounter with computer application 30 on client device 20 (or with client device 20 itself). The help request may, for example, include the customer's lay or plain language description of the problem that the customer has encountered and needs help with. Auto-solution advisor application 32 may interpret the help request as matching a specific problem and provide a matching solution for the specific problem with reference to database 40 (which may, for example, include a dictionary of solutions for different possible problems).

Auto-solution advisor application 32 may include algorithm-based text analysis (e.g., using a Latent Dirichlet Allocation (LDA) algorithm) of the customer's plain language description of the problem to identify specific problems. Further, auto-solution advisor application 32 may utilize machine learning to map the customer's plain language description of the problem to technical solutions of the problem. Further, auto-solution advisor application 32 may compare customer descriptions of a new problem with reports of past problems. Millions of existing reports of past problems can provide words, sentences, digits, etc. as training data for machine learning to attach or match technical solutions to the customer descriptions of the new problem.

In example implementations, problem description may include pre-defined "topics" (e.g., COMM error 3, COMM error 4, COMM error 5, etc.). Each help request may be categorized by the topics that are identified in the help request text. Each help request category may be associated with a pre-defined technical solution (e.g., Solution 1, Solution 2, Solution 3, etc.). For example, topic categories COMM error 3, COMM error 4, and COMM error 5 may refer to problem topics such as "wrong password," "no internet connection", and "wrong format input." Corresponding technical solutions (e.g., Solution 1, Solution 2, Solution 3, etc.) may, for example, be "reenter password," "reset connection," and "reformat input," etc.

Database 40 may include a list of pre-defined technical solution (e.g., solutions 41). Database 40 may further include a table 42 of help request categories and corresponding technical solutions. Table 42 of help request categories and corresponding technical solutions may, for example, be set up manually initially by an administrator and then enhanced or augmented by machine learning feedback. In example implementations, table 42 may include millions of existing descriptions of past problems providing data (words, sentences, digits, etc.) as training data for machine learning to attach or match technical solutions to a customer description of a new problem.

Figure 2:
FIG. 2 is an illustration of an example implementation of auto-solution advisor application that is configured to use machine learning to categorize help request text and then assign solutions to the help request based on help request category, in accordance with the principles of the present invention.

FIG. 2 show an example implementation of auto-solution advisor application 32 configured to use machine learning to categorize a help request by textual analysis and then assign solutions to the help request based on the help request category, in accordance with the principles of the present invention.

For this purpose, auto-solution advisor application 32 may include a pre-processing unit 33 configured to use to tokenizing, stopping and stemming techniques to prepare a string text in the help request for further analysis. Auto-solution advisor application 32 may further include a Latent Dirichlet allocation (LDA) module 34 that automatically discovers pre-defined topics that the help request text may contain. LDA module 34 may be configured to provide a document output that includes a numerical distribution of the topics that are identified as being present in the help request. The document output (with the numerical distribution of topics) may be referred to herein as the help request category.

Further, in auto-solution advisor application 32, a text categorization module 35 may, for example, utilize symmetric Kullback-Leibler divergence (also called Kullback-Leibler distance (KLD) measure) to determine a similarity of two help request texts using a term-scoring function that is based on the differences between the distribution of terms (topics) in a relevant document (i.e., document output of LDA module 34) and the distribution of terms (topics) in all documents that may be stored, for example, in table 42 in database 40.

Auto-solution advisor application 32 may determine that the help request category of an incoming help request is similar to a previous help request category in table 42 based on a similarity of the distribution of topics in the two help request categories, and assign the problem solution of the previous help request category (as identified in table 42 in database 40) as the suggested solution for the incoming help request.

A solutions presentation module 36 in auto-solution advisor application 32 may automatically present the suggested solution for the incoming help request to the customer.

Figure 3:
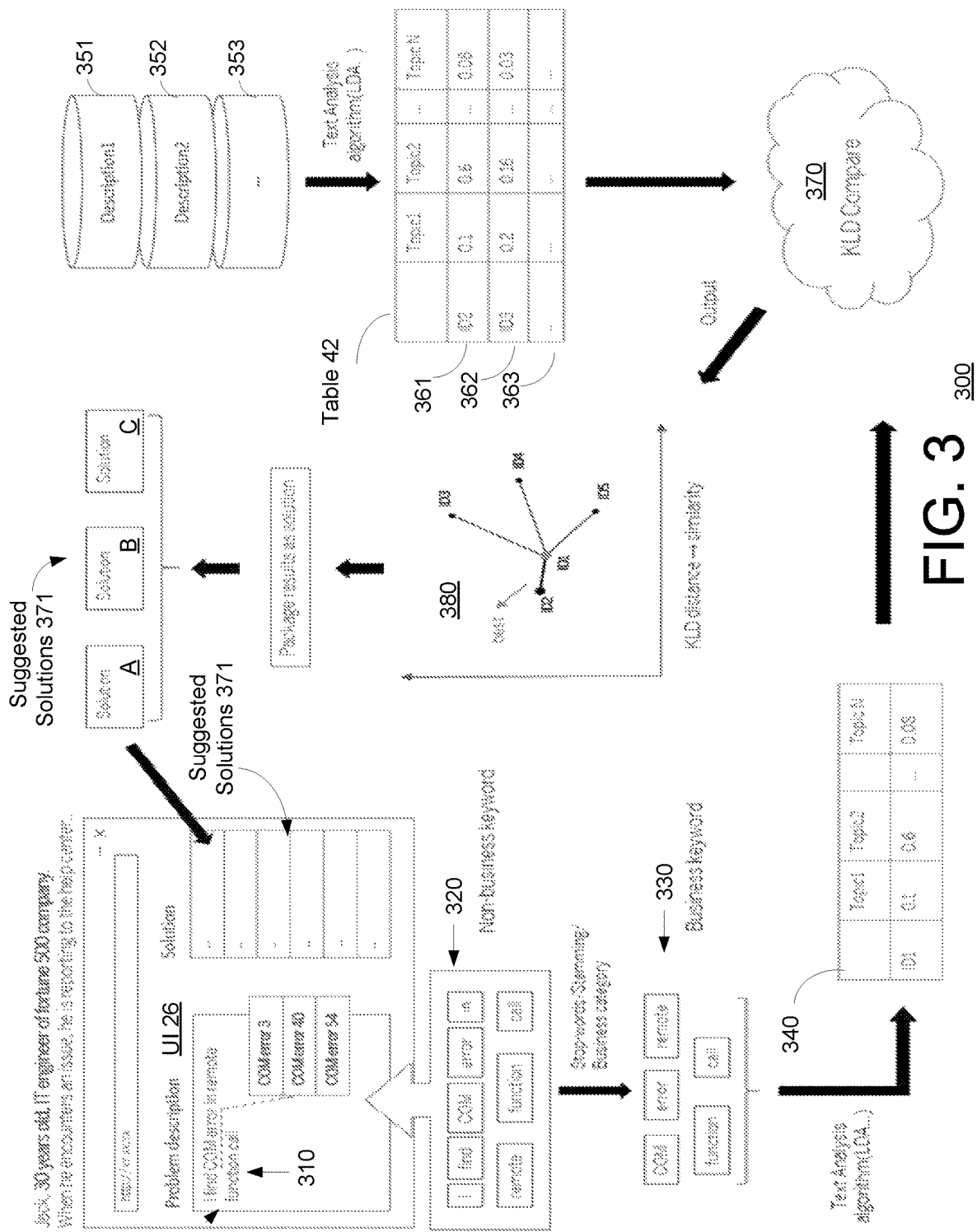
FIG. 3 is a schematic illustration of an example machine learning process by which an auto-solution advisor application can provide a technical solution to a customer's request for help with a problem, in accordance with the principles of the present disclosure.

FIG. 3 schematically shows an example machine learning process 300 by which system 100/auto-solution advisor application 32 can suggest a technical solution in response to a customer's request for help with a problem, in accordance with the principles of the present disclosure.

Process 300 may be initiated, for example, when the customer enters (e.g., in help UI 26), a lay language description 310 of a new problem that he or she has encountered and needs help with. As an example shown in FIG. 3, the customer may enter description 310: "I find COM error in remote function call", in help UI 26. The words in description 310 as expressed in lay language may include a set 320 of words (i.e., "I", "find", "COM", "error", "in", "remote," "function," and "call") that includes both non-technical words (e.g., "I", "find", and, "in") and technical words "COM", "error", "remote," "function," and "call"). Pre-processing unit 33 (in auto-solution advisor application 32) may include, machine learning algorithms to filter the non-technical words (i.e. stop words) (e.g., "I", "find", and, "in") and further use word stemming algorithms to reduce technical words to their word stems (base form) to arrive at a set 330 of base key words. Set 330 of base key words may be used by text analysis algorithms (e.g., in LDA module 34) to identify topics which may occur in description 310 and to categorize the help request. FIG. 3 shows, for example, a help request categorization (i.e., document 340) of the help request (i.e. description 310) that may be produced by LDA module 34. As shown in FIG. 3, help request categorization (i.e., document 340) may include a document ID (e.g., "ID1") and values for the relative frequency of occurrence (e.g., 0.1, 0.6, . . . and 0.08, respectively) of topics (i.e., topic 1, topic 2, . . . topic N) that are found by LDA module 34 to occur in description 310.

As described previously, system 100 may maintain (e.g., in database 40) a table 42 of help request categorizations (e.g., document 361, document 362, document 363, etc.) of different problem descriptions (e.g., description 351, description 352, description 353, etc.), which may have been previously processed by the text analysis algorithms. As shown in FIG. 3., each of the categorizations (e.g., document 361, document 362, document 363, etc.) may include an categorization ID (e.g., ID2, ID3, etc.) and values for the relative frequency of occurrence (e.g., (0.1, 0.6, . . . and 0.08), (0.2, 0.16, . . . 0.03), etc.) of topics (i.e., topic 1, topic 2, . . . topic N) that are found to occur in the different problem descriptions (e.g., description 351, description 352, description 353, etc.). Each of the categorizations (e.g., document 361, document 362, document 363, etc.) may be associated with one or more solutions (e.g., solution A, solution B, solution C, etc.) that may be listed, for example, in solutions 41 in database 40.

Further, in process 300, text categorization module 35 may initiate a process (e.g., KLD compare 370) to determine a KLD distance of the help request categorization (i.e., document 340 with ID1) of the help request (i.e. description 310) to each of the previous help request categorizations (e.g., document 362 with ID2, document 363 with ID3, etc.) stored in Table 42.

Graph 380, for purposes of illustration, pictorially shows as a star plot the KLD distances that may be determined by KLD compare 370 between document 340 with ID and documents with ID2, ID3, ID4 and ID5, etc. In graph 380, the KLD distance between two documents is represented by the length of the arrow connecting the two documents. As may be readily seen in the Graph 380, document 361 with ID2, for example, has the smallest distance (i.e., is the most similar) to document 340 with ID1.

Further, in process 300, text categorization module 35 may identify a set of solutions 371 (e.g., Solution A, Solution B and Solution C) associated with the most similar document (i.e., document 361 with ID2) in table 42 that has smallest distance to document 340 with ID1.

Solutions presentation module 36 may then automatically present the set of solutions 371 on UI 26, for example, as suggested solutions in response to the customer's help request 310.

For machine learning purposes, user feedback on whether the presented set of solutions 371 were proper solutions for the problem described in the lay language description 310 may be used to determine if description 310 (and associated set of solutions 371) should be added to table 42 of categorizations of previous help requests.

In example implementations, auto-solution advisor application 32 may be configured to begin analysis as soon as the customer begins typing a problem description (e.g., help request 310), identify the problem, and may automatically suggest technical solutions to the customer even before or immediately after the customer has completed typing in the complete problem description (e.g., help request 310).

FIG. 4 shows an example method 400 for suggesting technical solutions in response to a help request with a problem (e.g., with a computer application or computing device) in an information technology environment, in accordance with the principles of the present disclosure.

Method 400 may include receiving, at a server, the help request describing the problem (e.g., with a computer application or computing device) (410). The help request may include a text string describing the problem, for example in lay language (i.e. non-technical language). Method 400 may include filtering stop words, and stemming words in the text string of the help request (420), and further determining a frequency distribution of words corresponding to pre-defined topics in the filtered and stemmed help request to determine a category of the help request (430).

Method 400 may further include comparing the category of the help request with categories of previous help requests (440). Each of the categories of previous help requests may be associated with a set of one or more known solutions for the respective problem described by the previous help request. Method 400 may further include determining that the category of the help request is similar to a specific previous help request (450), and automatically assigning the set of one or more known solutions associated with the specific previous help request as the suggested solutions for the present help request (460).

A computer-implemented method includes receiving, at a server, a current help request describing in text a problem with a computer application or computing device, and determining whether the current help request is textually similar to a previous help request for a previous problem. The method further includes, based on the similarity of the current help request to the previous help request, assigning the known solution for the previous problem as the solution for the current help request.

In the computer-implemented method, determining whether the current help request is textually similar to a previous help request for a previous problem includes filtering stop words from, and stemming words in, the text of the current help request, and determining a frequency distribution of words corresponding to pre-defined topics in the filtered and stemmed help request to determine a category of the help request. Determining a frequency distribution of words corresponding to pre-defined topics in the filtered and stemmed help request includes using a Latent Dirichlet allocation (LDA) technique to automatically discover topics in the current help request, and categorizing the current help request based on the determined frequency distribution of words corresponding to pre-defined topics.

Further, in the computer-implemented method, determining whether the current help request is textually similar to a previous help request for a previous problem includes determining whether the category of the current help request is similar to the category of the previous help request. Determining whether the category of the current help request is similar to the category of the previous help request involved using a Kullback-Leibler distance (KLD) measure to determine a similarity of help request texts using a term-scoring function that is based on differences between the frequency distribution of topics in the current help request and the previous help request.

The techniques and methods (e.g., method 400) described herein may be implemented, for example, using system 100 (FIG. 1)

The various systems and techniques described herein may be implemented in digital electronic circuitry, or in computer hardware, firmware, software, or in combinations of them. The various techniques may implemented as a computer program product, i.e., a computer program tangibly embodied in an information carrier, e.g., in a machine readable non-transitory storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a standalone program or as a module, component, subroutine, or other unit suitable for use in a computing environment. A computer program can be deployed to be executed on one computer or on multiple computers at one site or distributed across multiple sites and interconnected by a communication network.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magnetooptical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magnetooptical disks; and CDROM and DVD-ROM disks. The processor and the memory may be supplemented by, or incorporated in special purpose logic circuitry.

Implementations may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

What is claimed is:

1. A computer-implemented method for an automated solution advisor comprised in machine learning based text processing system, the method comprising:
   receiving, at a server, a current help request from a user interface at a client computer, the current help request describing in text a problem with a computer application or the computing device;
   pre-processing, at the server, the current help request by at least filtering the text to remove one or more non-technical words and stemming the text by reducing one or more technical words in the text to a base form;
   in response to the pre-processing, determining, by the server and based on a Latent Dirichlet allocation to provide machine learning based discovery of a plurality of predefined topics, a first frequency distribution of the plurality of predefined topics in the preprocessed current help request;
   comparing, by the server, the first frequency distribution of the preprocessed current help request to a plurality of previous help requests, wherein the plurality of previous help requests include the plurality of predefined topics and a plurality of solutions associated with the plurality of predefined topics, wherein the comparing further comprises determining, by the server, the preprocessed current help request is textually similar to a previous help request, wherein determining the textual similarity between the preprocessed current help request and the previous help request uses a Kullback-Leibler distance (KLD) measure between the first frequency distribution of the preprocessed current help request and a second frequency distribution of the previous help request, wherein the previous help request is associated with a known solution for a previous problem, and wherein the second frequency distribution corresponds to the plurality predefined topics in the previous help request;

assigning, by the server and using the Kullback-Leibler distance (KLD) measure between the preprocessed current help request and the previous help request, the known solution for the previous problem as the known solution for the preprocessed current help request to enable presentation of a response to the current help request; and in response to a presentation of the known solution at the user interface of the client device, receiving, from the user interface, feedback indicative that the known solution was proper; and using the feedback to update a database containing the plurality of solutions associated with the plurality of predefined topics.

2. The computer-implemented method of claim 1, wherein the comparing includes determining, for the plurality of previous help requests, a plurality of frequency distributions.

3. The computer-implemented method of claim 1, wherein the Kullback-Leibler distance (KLD) measure provides a similarity measure using a term-scoring function based on differences between the first frequency distribution and the second frequency distribution.

4. A computer program product for an automated solution advisor comprised in machine learning based text processing system, the computer program product comprising instructions embodied on a non-transitory computer-readable storage medium, the instructions, when executed by at least one computing device, cause operations comprising:

receiving, at a server, a current help request from a user interface at a client computer, the current help request describing in text a problem with a computer application or the computing device;

pre-processing, at the server, the current help request by at least filtering the text to remove one or more non-technical words and stemming the text by reducing one or more technical words in the text to a base form;

in response to the pre-processing, determining, by the server and based on a Latent Dirichlet allocation to provide machine learning based discovery of a plurality of predefined topics, a first frequency distribution of the plurality of predefined topics in the preprocessed current help request;

comparing, by the server, the first frequency distribution of the preprocessed current help request to a plurality of previous help requests, wherein the plurality of previous help requests include the plurality of predefined topics and a plurality of solutions associated with the plurality of predefined topics, wherein the comparing further comprises determining, by the server, the preprocessed current help request is textually similar to a previous help request, wherein determining the textual similarity between the preprocessed current help request and the previous help request uses a Kullback-Leibler distance (KLD) measure between the first frequency distribution of the preprocessed current help request and a second frequency distribution of the previous help request, wherein the previous help request is associated with a known solution for a previous problem, and wherein the second frequency distribution corresponds to the plurality predefined topics in the previous help request;

assigning, by the server and using the Kullback-Leibler distance (KLD) measure between the preprocessed current help request and the previous help request, the known solution for the previous problem as the known solution for the preprocessed current help request to enable presentation of a response to the current help request; and in response to a presentation of the known solution at the user interface of the client device, receiving, from the user interface, feedback indicative that the known solution was proper; and using the feedback to update a database containing the plurality of solutions associated with the plurality of predefined topics.

5. The computer program product of claim 4, wherein the comparing includes determining, for the plurality of previous help requests, a plurality of frequency distributions.

6. The computer program product of claim 4, wherein the Kullback-Leibler distance (KLD) measure provides a similarity measure using a term-scoring function based on differences between the first frequency distribution and the second frequency distribution.

7. A system for an automated solution advisor comprised in machine learning based text processing system, the system comprising:

a processor; and a memory, the processor executing instructions stored in the memory to cause the system to provide operations comprising:

receiving, at a server, a current help request from a user interface at a client computer, the current help request describing in text a problem with a computer application or the computing device;

pre-processing, at the server, the current help request by at least filtering the text to remove one or more non-technical words and stemming the text by reducing one or more technical words in the text to a base form;

in response to the pre-processing, determining, by the server and based on a Latent Dirichlet allocation to provide machine learning based discovery of a plurality of predefined topics, a first frequency distribution of the plurality of predefined topics in the preprocessed current help request;

comparing, by the server, the first frequency distribution of the preprocessed current help request to a plurality of previous help requests, wherein the plurality of previous help requests include the plurality of predefined topics and a plurality of solutions associated with the plurality of predefined topics, wherein the comparing further comprises determining, by the server, the preprocessed current help request is textually similar to a previous help request, wherein determining the textual similarity between the preprocessed current help request and the previous help request uses a Kullback-Leibler distance (KLD) measure between the first frequency distribution of the preprocessed current help request and a second frequency distribution of the previous help request, wherein the previous help request is associated with a known solution for a previous problem, and wherein the second frequency distribution corresponds to the plurality predefined topics in the previous help request;

assigning, by the server and using the Kullback-Leibler distance (KLD) measure between the preprocessed current help request and the previous help request, the known solution for the previous problem as the known solution for the preprocessed current help request to enable presentation of a response to the current help request; and in response to a presentation of the known solution at the user interface of the client device, receiving, from the user interface, feedback indicative that the known solution was proper; and using the feedback to update a database containing the plurality of solutions associated with the plurality of predefined topics.

8. The system of claim 7, wherein the comparing includes determining, for the plurality of previous help requests, a plurality of frequency distributions.

9. The system of claim 7, wherein the Kullback-Leibler distance (KLD) measure provides a similarity measure using a term-scoring function based on differences between the first frequency distribution and the second frequency distribution.

* * * * *